United States Patent [19]

Ewing

[11] Patent Number: 5,138,980

[45] Date of Patent: Aug. 18, 1992

[54] TEMPERATURE-REGULATED LIQUID ANIMAL FEEDER

[76] Inventor: Frederick D. Ewing, 55 Oakmount Dr., Bedford, Nova Scotia B4A 2W1, Canada

[21] Appl. No.: 738,459

[22] Filed: Jul. 31, 1991

[51] Int. Cl.⁵ ............................................. A01K 7/00
[52] U.S. Cl. ................................... 119/73; 119/61
[58] Field of Search .............. 119/73, 74, 72, 78, 119/61

[56] References Cited

U.S. PATENT DOCUMENTS

| 1,497,202 | 6/1924 | Belden | 119/73 |
|---|---|---|---|
| 1,553,739 | 9/1925 | Belden | 119/73 |
| 2,554,086 | 5/1951 | Block | 119/51.5 |
| 2,612,138 | 9/1952 | Lindemann | 119/73 |
| 3,306,263 | 2/1967 | Johnson | 119/73 |
| 3,357,406 | 12/1967 | Robinson | 119/73 |
| 3,691,997 | 9/1972 | Hatch | 119/73 |
| 4,269,147 | 5/1981 | Vorbeck | 119/73 |
| 4,584,966 | 4/1986 | Moore | 119/73 |
| 4,757,784 | 7/1988 | Hammer | 119/72 |
| 4,986,221 | 1/1991 | Shaw | 119/73 |
| 5,025,754 | 6/1991 | Plyler | 119/73 |

Primary Examiner—John G. Weiss
Attorney, Agent, or Firm—Merchant Gould Smith Edell Welter & Schmidt

[57] ABSTRACT

An animal feeder is provided for delivering temperature-regulated liquid feed to one or more animal feed sites. A refrigerated or heated reservoir stores the liquid feed, and one two or three conduits lead from the reservoir to a feed dish which has a bowl portion and a heat exchange portion. A conduit supplies the bowl through a float valve which maintains the liquid in the bowl at a predetermined level. Conduits also circulate liquid through the heat exchange chamber which serves to cool or heat the solid and/or liquid feed in the bowl.

32 Claims, 6 Drawing Sheets

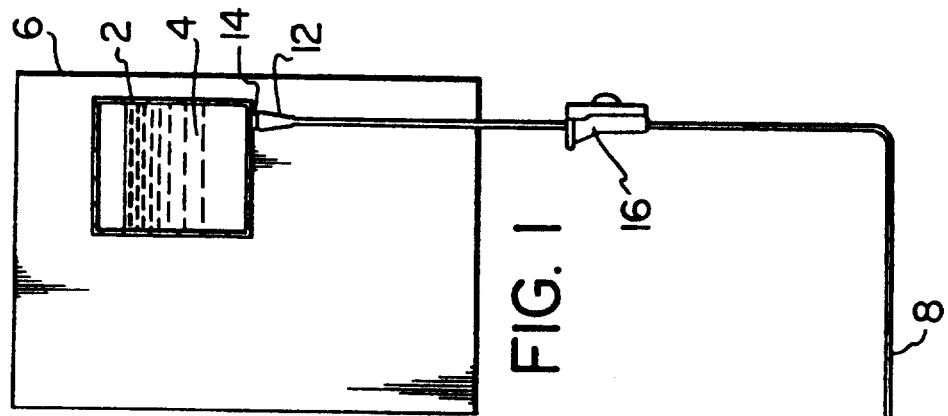
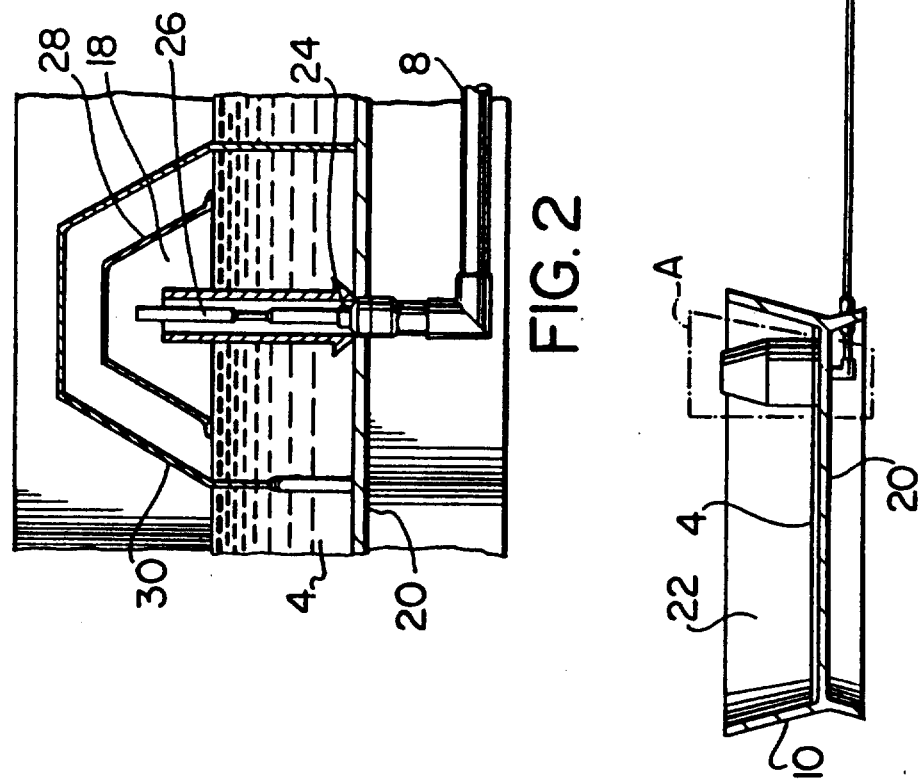

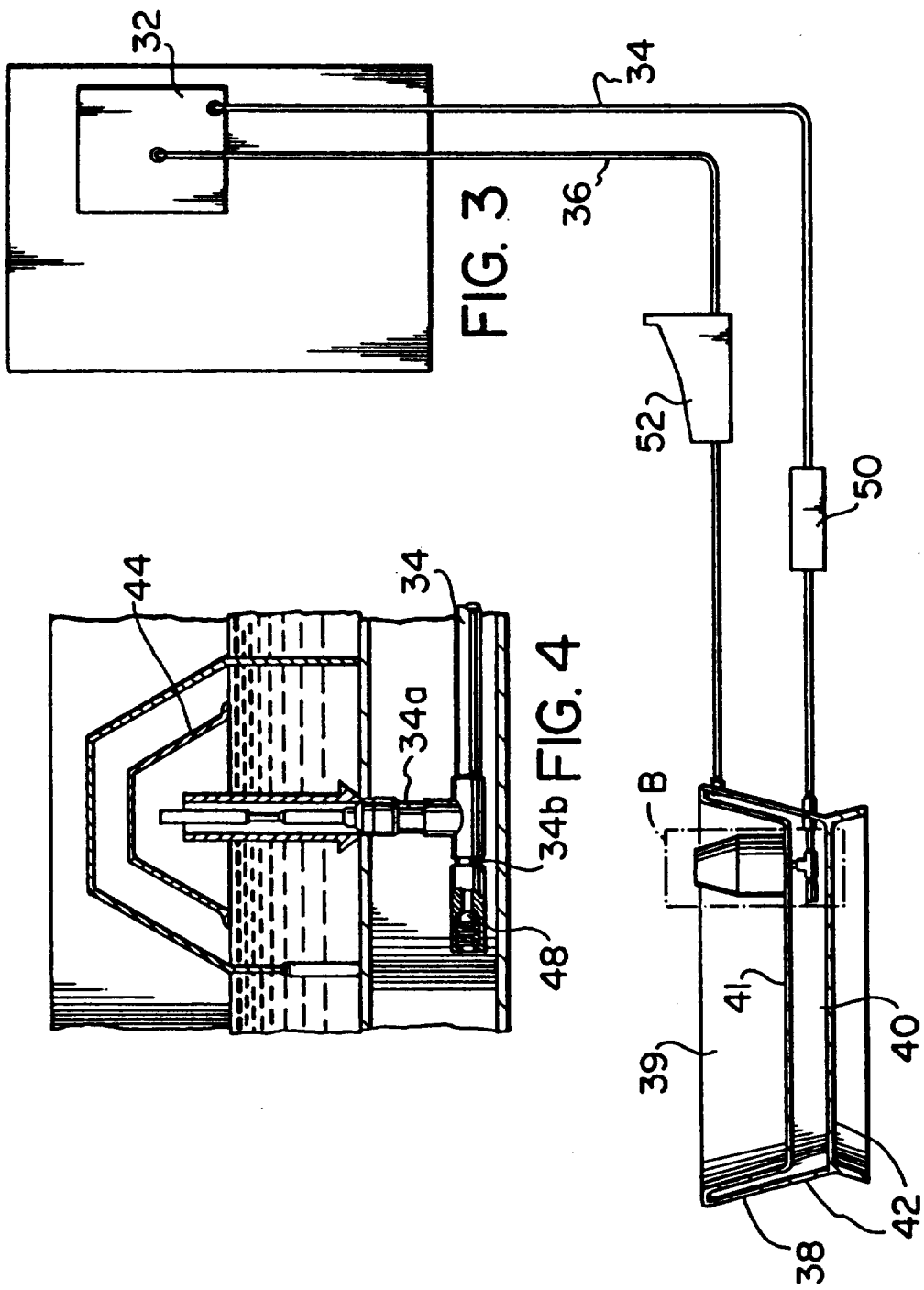

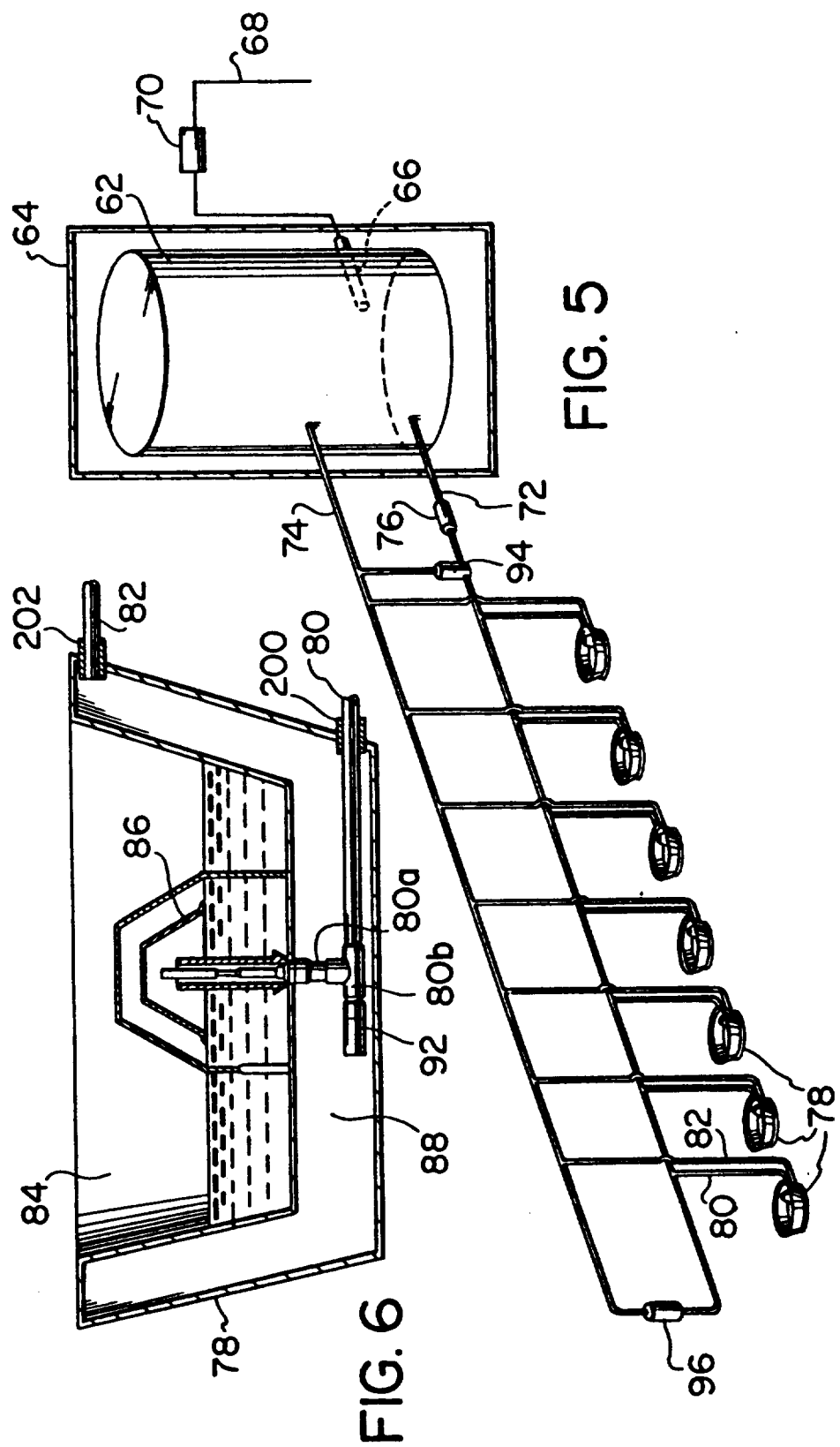

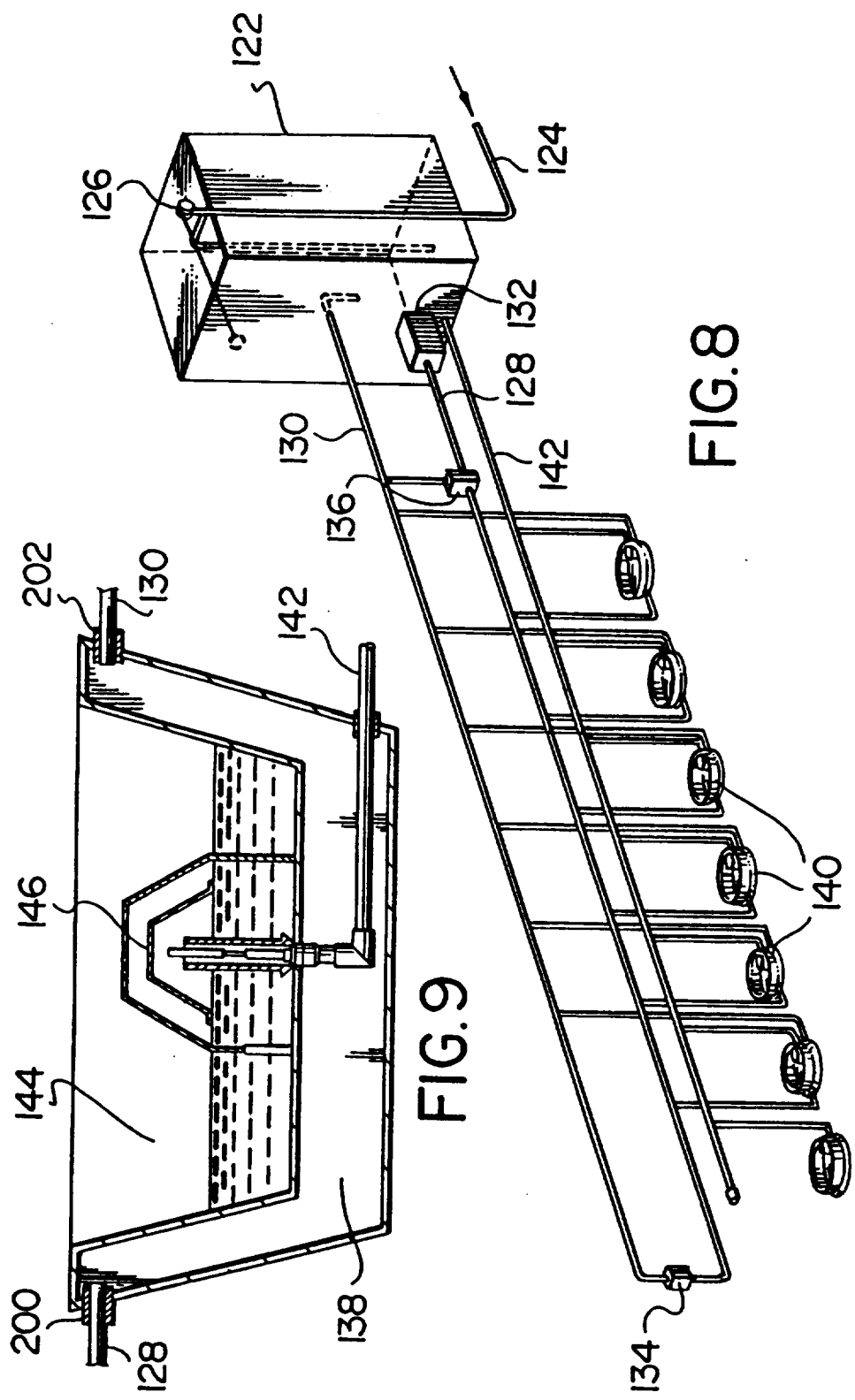

TEMPERATURE-REGULATED LIQUID ANIMAL FEEDER

BACKGROUND OF THE INVENTION

This invetnion relates to an improved device for providing liquid and other foods to animals, including pets and livestock.

Typically domestic animals, whether pets or livestock raised for commerce, are left untended for extended periods of time during the day or even over a course of several days. In order to meet the feeding needs of the animal, a common practice is to leave a supply at least of water, and possibly also of other feed substances, in a feeding location accessible to the animal. The animal is then able to feed at will from the supply.

In many circustances, this practice is far from ideal. A supply of water left for an animal inevitably ends up at room temperature, in which condition it is far less palatable or inviting to the animal than is cold, fresh water. Similarly, if solid foods are left out to supply the animal for any extended period of time, the food soon becomes warm and dry and much less appetizing for the animal. In the result, the animal may drink and eat far less than it should, lose weight and/or become dehydrated. This tends to hinder the general well-being of the animal, creating unhappiness or discomfort, and possibly ill-health. In commercial establishments, this may cause economic loss or necessitate greater human intervention in the care of the animal.

It has been found conversely that animals much prefer to drink cool water and will drink more water more often if they have access to cooler water. Animals also prefer to eat fresher solid food, and will feed more readily if such food is available.

The above circumstance occurs most acutely in warm, summer months. In freezing temperatures, problems are encountered with feed substances freezing and thus becoming unavailable for consumption by the animal. This latter situation has been addressed to some degree in the context of livestock watering devices. Generally, the following describe devices which are designed to supply water to livestock in freezing conditions: U.S. Pat. No. 3,306,263 issued Feb. 28, 1967 to Johnson; U.S. Pat. No. 2,612,138 issued Sep. 30, 1952 to Lindemann; U.S. Pat. No. 1,553,739 issued Sep. 15, 1925 to Belden; U.S. Pat. No. 1,497,202 issued Jun. 10, 1924 to Belden.

The above-referenced devices have been designed with the object of delivering quantities of water to livestock in freezing conditions. These devices do not address the problem of providing cooled liquid and solid feeds to animals in warmer temperatures, nor are any of these devices readily adaptable for use with pets or animals located at separate feed sites, or where transmission of disease between animal users may be a consideration.

SUMMARY OF THE INVENTION

In accordance with one embodiment of the present invention, there is disclosed an animal feeding apparatus for delivering temperature-regulated liquid feed comprising a feed bowl and a storage means for retaining the liquid feed at a selected temperature at an elevation above the feed bowl. A supply conduit communicates with the storage means and the feed bowl for conveying the liquid feed to the feed bowl. A float valve is provided intermediate the supply conduit and the feed bowl to permit controlled inflow of the liquid feed and maintain the liquid feed at a predetermined level.

In accordance with another embodiment of the invention, there is disclosed an animal feeding apparatus for delivering temperature-regulated liquid feed comprising a storage means for retaining the liquid feed at a selected temperature. A supply conduit communicates with the storage means for conveying the liquid feed to a feed site, and a return conduit communicates with the storage means for conveying the liquid feed from the feed site to the storage means. A means is provided for inducing circulation of the liquid feed in the supply conduit and the return conduit. At least one feed dish is provided having a bowl and a heat exchange chamber adjacent thereto. The heat exchange chamber is connectable to the supply conduit and the return conduit so as to induce circulation of the liquid feed in the heat exchange chamber. A valve means is associated with the feed dish intermediate the supply conduit and the bowl to permit controlled inflow of the liquid feed into the bowl, and a means is provided for inducing the inflow of liquid feed into the bowl.

In accordance with another embodiment of the present invention, there is disclosed an animal feeding apparatus for delivering temperature-regulated liquid feed comprising a storage means for retaining the liquid feed at a selected temperature. A first circulation conduit communicates with the storage means for conveying the liquid feed to a feed site, and a second circulation conduit communicates with the storage means for conveying the liquid feed from the feed site to the storage means. A means is provided for inducing circulation of the liquid feed in the first and second circulation conduits. A third conduit communicates with the storage means. At least one feed dish is provided having a bowl and a heat exchange chamber adjacent thereto. The heat exchange chamber is connectable to the first and second circulation conduits so as to induce circulation of the liquid feed in the heat exchange chamber, and the bowl is connectable to the third conduit. A valve means is associated with the feed dish intermediate the third conduit and the bowl to permit controlled inflow of the liquid feed into the bowl, and a means is provided for inducing the inflow of liquid feed into the bowl.

BRIEF DESCRIPTION OF THE DRAWINGS

Preferred embodiments of the present invention will now be described in greater detail and will be better understood when read in conjunction with the attached drawings in which:

FIG. 1 is a partial sectional view of an embodiment of the temperature-regulated liquid animal feeder of the subject invention having one conduit.

FIG. 2 is a detail view of part A of the animal feeder shown in FIG. 1.

FIG. 3 is a partial sectional view of an alternate embodiment of the temperature-regulated liquid animal feeder having two conduits.

FIG. 4 is a detail view of part B of the animal feeder shown in FIG. 3.

FIG. 5 is a schematic view of an alternate embodiment of the temperature-regulated liquid animal feeder having two conduits and a plurality of feed sites.

FIG. 6 is a sectional view of a feed dish used in the animal feeder shown in FIG. 5.

FIG. 8 is a schematic view of an alternate embodiment of the temperature-regulated liquid animal feeder having three conduits and a plurality of feed sites.

FIG. 9 is a sectional view of a feed dish used in the animal feeder shown in FIG. 5.

DESCRIPTION OF THE PREFERRED EMBODIMENTS

Figure 7:
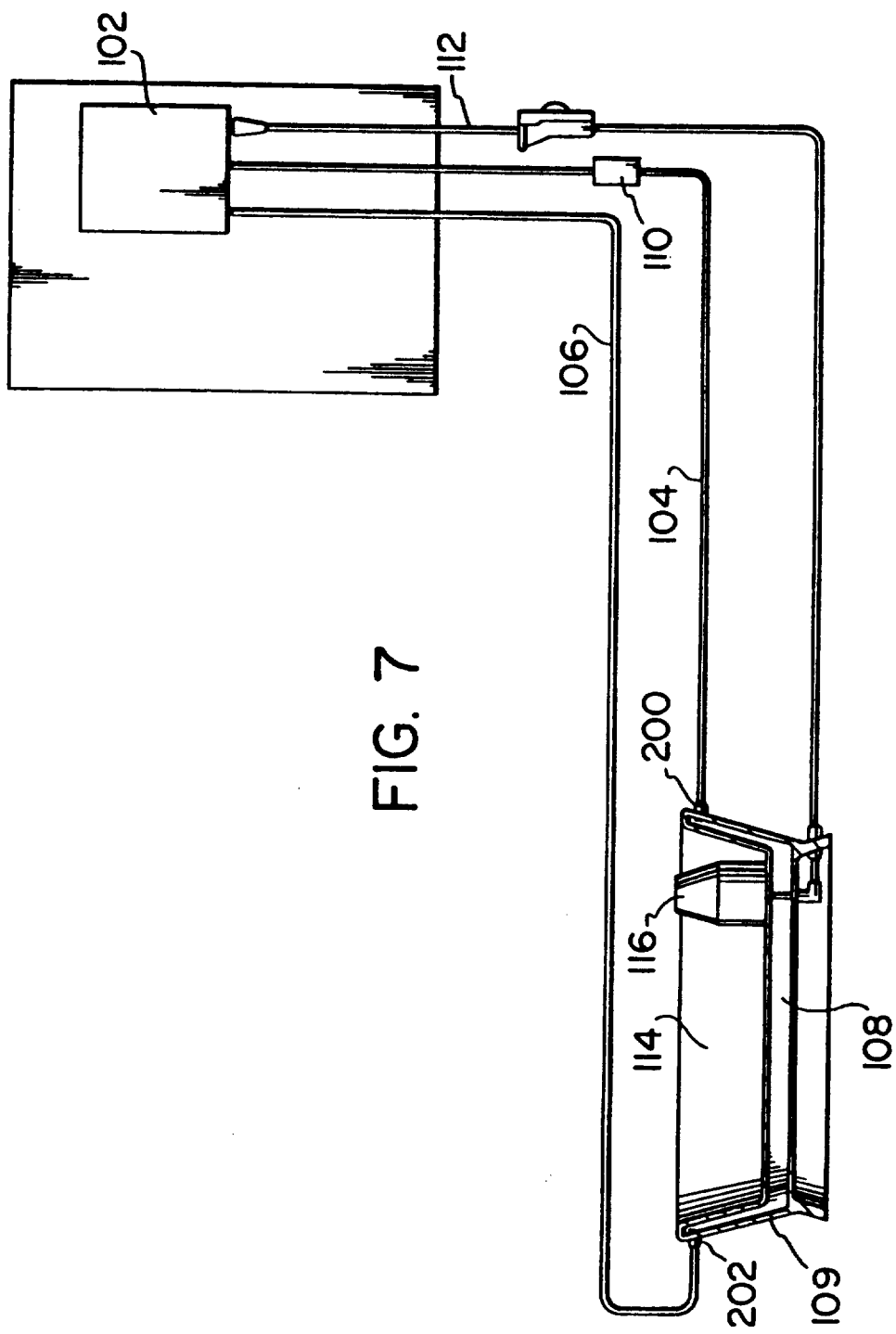
FIG. 7 is a partial sectional view of an alternate embodiment of the temperature-regulated liquid animal feeder having three conduits.

With reference first to FIG. 1, there is shown a temperature-regulated liquid animal feeder.

A reservoir 2 is a storage means for containing a supply of liquid feed 4 for a subject animal (not shown). Liquid feed 4 may be any substance suitable for feeding to an animal, including, for example, water, dissolved or liquified food, or a medicinal substance. In the description of the invention herein, it is assumed that the liquid feed is water unless otherwise indicated, but it is understood that the animal feeder may be used with other such liquid feed substances. Reservoir 2 is filled and stored in a refrigerator 6 where the water is maintained at the ambient temperature of refrigerator 6. Reservoir 2 is vented to permit removal of water.

A supply conduit 8 communicates with reservoir 2 and leads out of refrigerator 6 to a feed bowl 10 located at the feed site, preferably close to the refrigerator, where the pet or other animal is normally fed. The inside diameter of supply conduit 8 is in the order of 1½ mm. which is suitable for providing water for a single small animal, but will be larger if a more viscous liquid feed is to be used, or if larger or more numerous animals will require greater consumption and an increased flow rate.

Flexible, transparent plastic tubing such as is commonly in use in hospitals is an appropriate material for supply conduit 8. A relatively small diameter is preferable so that a minimum amount of water is stored in supply conduit 8 outside of refrigerator 6. With a small diameter, surface tension resists the initial free flow of water into supply conduit 8 so a primer bulb 12 and check valve 14 are provided at the point of connection of supply conduit 8 to initiate the flow.

Reservoir 2 is located on a shelf in refrigerator 6 and is thus elevated above feed bowl 10. Once supply conduit 8 becomes filled, the force of gravity is sufficient to induce the water to flow freely through supply conduit 8. A flow control and on/off valve 16 is provided in supply conduit 8 to permit control of the flow rate if necessary. Valve 16 is a wedged device with a knob which when rotated bears progressively on the tube to constrict and ultimately close the passageway in supply conduit 8.

Feed bowl 10 is an insulated bowl suitable for retaining liquid feed 4 for consumption by the animal. Supply conduit 8 communicates through the wall 20 of feed bowl 10 to the interior 22 of the bowl. A float valve 18 shown in greater detail in FIG. 2, is disposed intermediate supply conduit 8 and feed bowl interior 22 provides valve means to control the inflow of water and maintain water in the bowl at a predetermined level.

A valve 24 is activated by float stem 26, which is itself attached to float 28. When feed bowl 10 is empty of water, or the water is below a predetermined level, float 28 and float stem 26 are in such positions that valve 24 is open allowing water to flow into feed bowl 10. As water flows in, float 28 floats on the surface and rises with the water level. Float stem 26 rises with float 28. Once the water reaches an optimal, predetermined level, valve 24 closes and the inflow of water ceases. The system remains in equilibrium until water is removed from the bowl. When the level drops, float 28 and float stem 26 also drop which opens valve 24 allowing inflow of water until the water level in feed bowl 10 reaches the predetermined level. A vented protective guard 30 is placed over float valve 18 so that activity by the animal does not interfere with the operation of the float valve.

Optimally, quick connect/disconnect fittings of conventional design (not shown) are used to connect supply conduit 8 to reservoir 2 and feed bowl 10 so that the components may be easily removed for cleaning, disinfecting, refilling or replacement, as the case may be. Also, feed bowl 10 and supply conduit 8 are optimally insulated to reduce heat transfer through the walls thereof.

In use, reservoir 2 is filled with water and placed in refrigerator 6 where the water is chilled to the ambient temperature and will thus be kept fresh indefinitely. Optimally, feed bowl 10 is kept as close to refrigerator 6 as is conveniently possible to minimize the length of supply conduit 8 which is exposed to room temperature.

With valve 16 fully open, primer bulb 12 is squeezed if necessary to fill supply conduit 8 with water. The expansion of primer bulb 12 in conjunction with check valve 14 creates reduced pressure in supply conduit 8 which draws the water from reservoir 2. A few squeezes is normally sufficient to prime supply conduit 8. The elevation of reservoir 2 above feed bowl 10 then provides means for inducing the flow of water in supply conduit 8 in that the force of gravity acts on the water to draw the water from reservoir 2, through supply conduit 8 to feed bowl 10.

Water flows through supply conduit 8 and float valve 18 into feed bowl 10. Once the water in feed bowl 10 reaches a predetermined level, float valve 18 prevents further inflow until water is removed from feed bowl 10.

The water flowing from reservoir 2 is of lowered temperature due to refrigeration. When the animal drinks from feed bowl 10, the water removed is replenished by fresh, cool water from reservoir 2 which is more palatable to the animal than water at or near room temperature. The quantity of water in feed bowl 10, a function of the size of feed bowl 10 and of the level predetermined for operation of float valve 18, is kept to a minimum so that the animal will quickly consume any water which has been sitting in feed bowl 10 and begin to receive cooled water from reservoir 2.

The optimal quantity of water in feed bowl 10 depends upon the type of animal. For example, a cat has a small tongue so a relatively shallow level is indicated. A dog has a larger tongue and will require somewhat greater depth of water. The position of float 28 on float stem 26 is preferably adjustable so that the predetermined level of water may be adjusted.

Similarly, the flow rate is adjusted to be optimal for the demands of the animal or animals. A greater flow rate may be obtained by using a larger diameter of tubing for supply conduit 8, or simply by placing reservoir 2 at a greater elevation in refrigerator 6.

Referring to FIG. 3, an alternate embodiment of a temperature-regulated animal feeder in shown.

Reservoir 32 is a storage means which comprises a vented container suitable for placement in a refrigerator for containment of water or other liquid feed. A supply conduit 34 communicates with reservoir 32 at its base, and a return conduit 36 communicates with reservoir 32 near its top. Supply and return conduits 34,36 are preferably plastic tubing in the range of about 3 to 4 mm. inside diameter.

A feed dish 38, located in use at an appropriate feed site, has an interior bowl portion 39 of any shape suitable to contain the feed or feeds which are to be provided to the animal. Feed dish 38 also has a heat exchange chamber 40 which is adjacent to bowl 39. Heat exchange chamber 40 permits the circulation of cooled water from reservoir 32 which serves to remove heat from the surfaces of bowl 39 thus cooling the contents thereof.

In the embodiment illustrated, heat exchange chamber 40 is a cavity within the walls of feed dish 38 which is closed except for a passage communicating with bowl 39 (described below) and inlet and outlet ports 200,202 (see FIG. 6) to permit the circulation of water therethrough. Other types of heat exchange chamber may alternatively be used, for example, a heat exchange coil within the wall of the feed dish or attached to the interior of the bowl (not illustrated).

Optimally, the material which forms the wall 41 separating heat exchange chamber 40 and bowl 39 is highly conductive of heat. For this reason, wall 41 of bowl 39 is preferably formed of metal.

Figure 10:
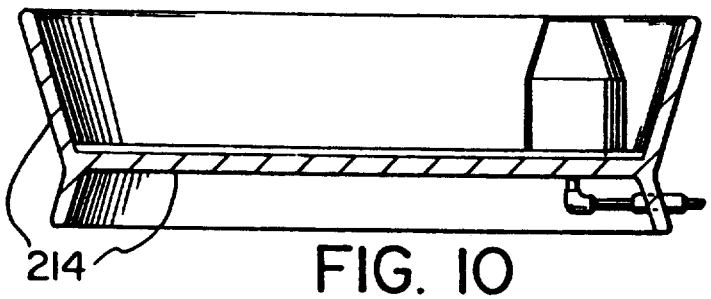
FIG. 10 is a sectional view of a first variation of the feed dish for use in the subject invention.
Figure 11:
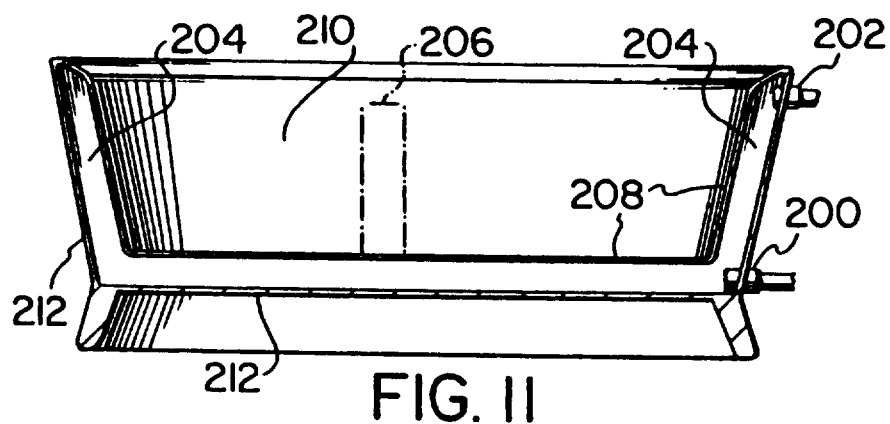
FIG. 11 is a sectional view of a second variation of the feed dish for use in the subject invention.
Figure 12:
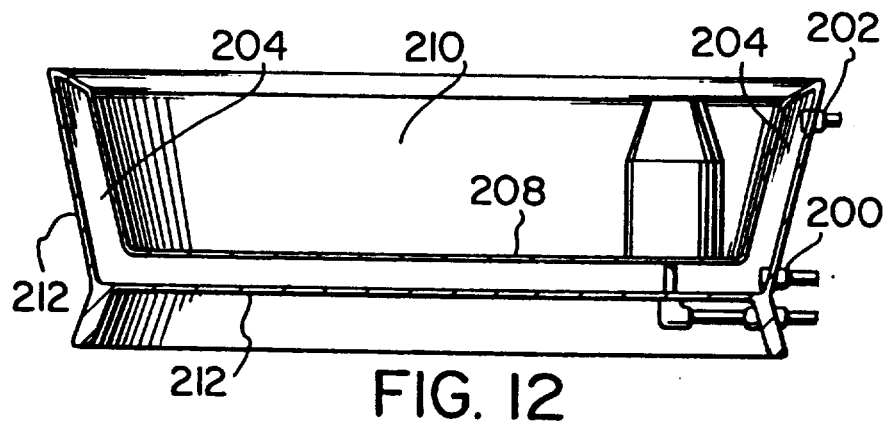
FIG. 12 is a sectional view of a third variation of the feed dish for use in the subject invention.
Figure 13:
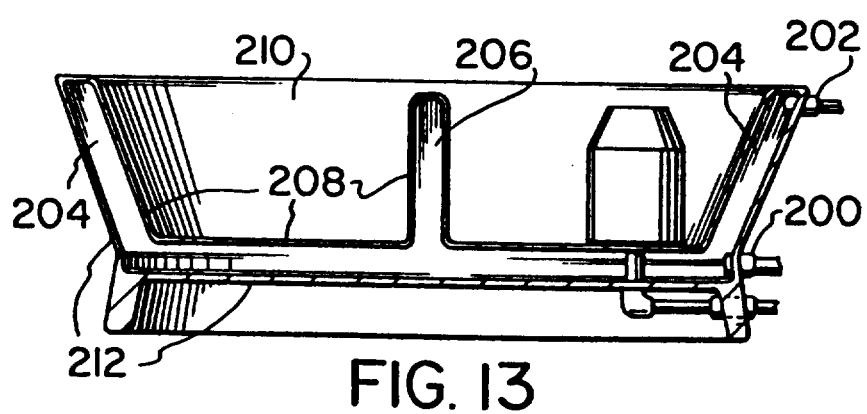
FIG. 13 is a sectional view of a fourth variation of the feed dish for use in the subjection invention.

Preferably, feed dish 38 has relatively high side walls 204 into which heat exchange chamber 40 extends, as shown in FIG. 10. High side walls 204, in the order of about 80 mm., for example, resist loss of heat from the contents of bowl 39 from convectional air currents. Optionally, feed dish 38 may have one or more partitions 206 within bowl 39 to form discrete areas in bowl 39 for different types of food.

Supply conduit 34 and return conduit 36 circulate water from reservoir 32 to heat exchange chamber 40 and back to reservoir 32, and are also preferably disposed so as to induce circulation of water within heat exchange chamber 40. Circulation is induced within heat exchange chamber 40 merely by separating the terminus of supply conduit 34 and the beginning of return conduit 36 within heat exchange chamber 40. While all of the arrangements shown in the drawings will provide adequate circulation, an optimal arrangement for inducing circulation in the heat exchange chamber is shown in FIG. 7 and described below.

Consistent with what has been discussed with reference to FIG. 1, a liquid feed other than water may be used in which case such other liquid feed functions both as a coolant to cool bowl 39 and as a feed for the animal.

The exterior wall 42 of feed dish 38 is preferably insulated to resist the conduction of heat to the feed dish interior and heat exchange chamber 40 from the ambient surroundings. Optimally, supply and return conduits 34,36 are also insulated.

A float valve 44 is disposed intermediate supply conduit 34 and bowl 39 to permit controlled inflow of water into bowl 39. As discussed with reference to FIGS. 1 and 2, float valve 44 functions to maintain the level of water in bowl 39 at a predetermined level, and is preferably adjustable.

As shown in FIG. 4, supply conduit 34 preferably branches, a first branch 34a communicating with bowl 39 through float valve 44, a second branch 34b communicating with heat exchange chamber 40. Additionally, branch 34b has check valve 48 to prevent any water from heat exchange chamber 40 from entering bowl 39.

Branches 34a and 34b and check valve 48 ensure that the water entering bowl 39 will be water supplied directly from reservoir 32, and therefore be in the best condition for drinking by the animal. However, branches 34a, 34b and check valve 48 are optional, since the water to be supplied to bowl 39 through float valve 44 can alternatively be drawn from the water circulating in heat exchange chamber 40. Provided circulation through supply conduit 34, heat exchange 40 and return conduit 36 is adequate, the water in heat exchange chamber 40 will at all times remain cool and fresh for drinking by the animal. If branches 34a, 34b are eliminated, supply conduit 34 terminates at port 200, as shown in FIG. 10(b), or at any other suitable point within heat exchange chamber 40.

Means are provided for inducing circulation of water in supply conduit 34 and return conduit 36. A pump 50 is disposed in supply conduit 34. Pump 50 may be a very low volume pump which operates continuously, or a pump which is operable at selected intervals. In the latter case, a control means of conventional design (not illustrated) is provided to cycle pump 50 on and off at selected intervals. Where pump 50 does not operate continuously, pump 50 must be designed to permit the flow of water when not operating as water must be able to flow to the feed dish for feeding even when there is no return flow through return conduit 36. An impeller type pump is accordingly preferable for cyclical operation.

There is a wide range of possible specifications which will enable the animal feeder to function adequately to circulate and exchange the water in the system sufficiently frequently to maintain the water in heat exchange chamber 40 and in bowl 39 at a cool temperature. For example, it has been found that operating pump 50 every half hour with a volume in the order of one half to three quarters of a liter per minute, for a period of one minute provides more than enough volume to maintain the temperature in heat exchange chamber 40 and bowl 39 substantially below room temperature. In any specific instance, an optimal arrangement is established depending upon numerous factors, such as the actual room and refrigerator temperatures, the desired temperature in bowl 39, and the degree of insulation of feed dish 38, and supply and return conduits 34,36.

Other means may also be used to induce circulation in supply and return conduits 34,36. In some applications, a fluid convectional current within conduits 34,36 may assist in providing adequate circulation. A combination of pump and convectional means may thus be used to induce circulation.

Means are also provided to induce the inflow of liquid feed into bowl 39. If pump 50 operates continuously flow control valve 52 in return conduit 36 is adjusted to constrict return conduit 36 sufficiently to raise the fluid pressure within heat exchange chamber 40 and supply conduit 34 (downstream from pump 50) sufficiently to bring about a pressure differential between the water in heat exchange chamber 40 and in bowl 39 which induces water to flow upward through float valve 44 into bowl 39.

Alternatively, if there is no pump 50 or if pump 50 operates only at selected intervals, reservoir 32 is elevated above feed dish 38 so that gravitational forces acting on the water in reservoir 32 and in supply conduit 34 bring about a pressure differential between the water in heat exchange chamber 40 and in bowl 39 and thus induce upward flow through float valve 44 into bowl 39. Alternatively, reservoir 32 may be pressurized, similarly as illustrated in FIG. 5 and described below. A combination of such means also be used to induce inflow of water into bowl 39.

The operation of the embodiment of the animal feeder illustrated in FIG. 3 is substantially similar to that of FIG. 1 with a few differences. As long as float valve 44 is closed there is no exchange of water between supply conduit 34 and heat exchange chamber 40, on one hand, and bowl 39, on the other. When float valve 44 is open, the pressure differential discussed above ensures that water flows from supply conduit 34 to bowl 39, and that none that water flows from supply conduit 34 to bowl 39, and that none flows from bowl 39 to supply conduit 34 or heat exchange chamber 40.

Cooler water circulates continuously or intermittently from reservoir 32 through supply conduit 34, heat exchange chamber 40, and return conduit 36. Some of the cooled circulating water enters bowl 39 to provide liquid feed for an animal, and is thus replenished as consumed. The rest of the water circulates drawing heat from bowl 39 and its contents, thus cooling same and maintaining the food in a fresh and palatable state. Where one or more partitions 206 are provided, the part of bowl 39 which does not have float valve 44 may be used for solid foods, or other types of liquid food than are in reservoir 32. Such other foods will also be kept cool, fresh and palatable.

The animal feeder shown in FIG. 5 is similar in most respects to that in FIG. 3 but is adapted to deliver liquid feed to a plurality of animal feed sites. An animal feed site in this case may be, for example, one of several pens in a dog kennel or other establishment for raising livestock such as a mink or fox farm.

Reservoir 62 is a storage means for containment of water or other liquid feed for a number of animals. Reservoir 62 is therefore larger in size than reservoir 32. Other modifications are also illustrated in FIG. 5, but such modifications may equally be adapted to the other embodiments of the animal feeder described herein.

Reservoir 62 is located in refrigeration unit 64 to provide cooled water when required. Reservoir 62 also is provided with a thermostatically controlled heating element 66 for provision of heated water when required, for example, if animals are lodged in below freezing temperatures in winter.

Reservoir 62 is a closed vessel which is continuously supplied with water through domestic water line 68. An adjustable pressure reducing valve 70 is provided in line 68 to reduce the incoming pressure to about 1¼ to 2 psi. Reservoir 62, and all passageways and chambers in fluid communication with it, are thus slightly pressurized.

Supply conduit 72 and return conduit 74 communicate with reservoir 62 and are of sufficient capacity, for example 1¼" in diameter, to supply a plurality of animal feed sites. A pump 76 in supply conduit 72 induces circulation of water in supply and return conduits 72,74.

Pump 76 operating at about 6 psi with a volume of about 20 gallons per minute is more than adequate for a substantial number of feed sites.

A control means of conventional design (not illustrated) is provided to cycle pump 76 on and off at selected intervals. Pump 76 is designed to permit the flow of water when not operating as water must be able to flow to feed sites for feeding even when there is no return flow through return conduit 74. An impeller type pump is accordingly preferred.

At each feed site is a feed dish 78 which is substantially the same as feed dish 38 described above. Preferably, for convenient operation, feed dish 78 is connected to supply conduit 72 and return conduit 74 through secondary supply conduit 80 and secondary return conduit 82, which are formed of plastic tubing having inside diameter of the order of about ¼".

For convenience, as discussed above, as well as versatility, the connections are made with quick connect/disconnect fittings. conventional quick connect/disconnect fittings are provided with stop valves to prevent flow or leakage when disconnected. If such fittings are used, it can be seen that one or more feed dishes 78 may be removed from the system without affecting the operation of the others. Thus, the system can be designed for any number of feed sites, but any subset of the feed sites may be in use at a particular time while the others are vacant or otherwise taken out of operation for cleaning, repair, etc.

As shown in FIG. 6, secondary supply conduit 80 preferably branches, a first branch 80a communicating with bowl 84 through float valve 86, a second branch 80b communicating with heat exchange chamber 88. Additionally, branch 80b has check valve 92 to prevent any water from heat exchange chamber from entering bowl 84.

For safety, supply conduit 72 and return conduit 74 are connected through pressure relief valve 94 downstream of pump 76 to permit release of pressure in supply conduit 72 should it build up to a predetermined level, about 8 psi.

Supply conduit 72 and return conduit 74 are also connected at their end through solenoid valve 96, which is electrically operated and controlled to operate in cooperation with pump 76.

Pump 76 and solenoid valve 96 are controlled to operate in the following sequence. First, pump 76 is activated and solenoid valve 96 opens to allow free passage of water to be pumped through supply conduit 72 through solenoid valve 96 returning to reservoir 62 through return conduit 74. This flushing action continues sufficiently long to replace any warmer water in supply and return conduit 72,74 with cooled water from reservoir 62. Approximately 30 seconds of flushing would be required with a system of 10 feeding sites.

Second, solenoid valve 96 closes while pump 76 remains activated. Pressure developes in supply conduit 72 which is greater than that in return conduit 74, so that cooled water fresh from reservoir 62 is forced down secondary conduit 80 flushing out warmer water from heat exchange chambers 88 in feed dishes 78 at each feed site. Warmer water flushed from heat exchange chambers 88 flows in secondary return conduits 82, through return conduit 74 to reservoir 62 for recooling. Approximately 2 minutes of flushing would be required with a system of 10 feeding sites.

Third, pump 76 ceases operating while solenoid valve 96 remains closed. Cooled water may continue to flow from reservoir 62, through supply conduit 72, secondary supply conduit 80 and through float valve 86 into bowl 84 for consumption by the animal. Since reservoir 62 is closed and slightly pressurized, there is positive fluid pressure in heat exchange chamber 88. The pressure differential between heat exchannge chamber 88 and bowl 84 thus induces the flow of water into bowl 84 when float valve 86 is open. If reservoir 62 is elevated above feed dish 78, gravitational forces will also bring about a pressure differential and thus induce the flow of water into bowl 84 when float valve 86 is open.

Any water which is taken from the system is replenished through water line 68, so reservoir 62 stays full and slightly pressurized at all times.

The operation at feed dish 78 at each feed site is similar to that described above with respect to FIG. 3. The cooled water in heat exchange chamber 88 cools the contents of bowl 84, which may be partitioned and contain both solid and liquid foods. Cooled water or other liquid feed, as the case may be, enters bowl 84 as needed for consumption by the animal.

As long as float valve 86 is closed there is no exchange of water between supply conduit 72, secondary supply conduit 80 and heat exchange chamber 88, on one hand, and bowl 84, on the other. When float valve 86 is open, the pressure differential discussed above ensures that water flows from secondary supply conduit 80 to bowl 84, and that none flows from bowl 84 to secondary supply conduit 80 or heat exchange chamber 88. This aspect is particularly important in a system involving a number of animals to prevent any communication of disease from a sick animal into the circulating water from which other animals may become infected.

Also, check valve 92, in cooperation with branches 80a and 80b, ensures that water entering bowl 84 is drawn from supply conduit 72, and is thus cooler and more palatable for drinking.

A number of variants are possible within the scope of the invention. Solenoid valve 96 may be replaced by a flow control valve such as is shown in FIG. 3. The flow control valve constricts the flow sufficiently to bring about a fluid pressure differential between the water in supply conduit 72 and return conduit 74, so that water circulates through supply and return conduits 72,74 and simultaneously is flushed through heat exchange chamber 88 at each feed site. Similarly, pump 76 may be a very low volume pump and the end connection between supply and return conduits 72,74 may be eliminated, in which case all water is flushed through heat exchange chambers 88 at each feed site. In either case, pump 76 may operate intermittently or continuously depending on the desired rate and frequency of replacement of water in the system.

Also, instead of reservoir 62 a vented, open tank may be used having means for refilling such as is shown in FIG. 6 and described below. In such case, since reservoir 62 is not pressurized, alternate means are provided to induce the flow of water into bowl 84. Reservoir 62 may be elevated above the feed sites so that gravitational forces acting on the water in reservoir 62 and in supply conduit 72 bring about a pressure differential between the water in heat exchange chamber 88 and in bowl 84. Also, if pump 76 operates continuously, a flow control valve (not illustrated) may be provided in return conduit 74 which constricts flow and causes a pressure differential in heat exchange chamber 88 similar to what was discussed above with reference to FIG. 3. A combination of these and other means may be provided to induce the flow of water into the bowl 84.

Referring to FIG. 7, reservoir 102 is a storage means similar in principle to that described with reference to FIG. 3, except that three conduits communicate with reservoir 102.

First circulation conduit 104 and second circulation conduit 106 communicate with reservoir 102 and with heat exchange chamber 108 of feed dish 109 at lower and upper ports 200 and 202 respectively. Pump 110, operating continuously or intermittently, induces circulation of water from reservoir 102 through first circulation conduit 104 to heat exchange chamber 108, and back through second circulation conduit 106.

First and second circulation conduits 104, 106 are arranged so as to induce circulation of water in heat exchange chamber 108. An optimal arrangement is illustrated in FIG. 7. Ports 200 and 202, at which conduits 104, 106 communicate with heat exchange chamber 108, are located on opposite sides of feed dish 109, to maximize separation of the terminus of conduit 104 from that of conduit 106. Ports 200 and 202 are located at the same elevation, preferably as high as possible on the side of feed dish 109. Cooler water is denser than warmer water, so the cooler water from first circulation conduit 104 tends to gravitate to the lower part of heat exchange chamber 108 and this becomes mixed with the water already therein. The warmer water is displaced upward to enter second circulation conduit 106 through which it returns to reservoir 102 for cooling.

Third conduit 112 is similar to supply conduit 8 described with reference to FIGS. 1 and 2. Third conduit 112 supplies bowl 114 through float valve 116 without any direct communication with heat exchange chamber 108.

The water in first and second circulation conduits 104, 106 thus functions as a coolant for bowl 114 and its contents, while bowl 114 is supplied independently from third conduit 112.

It will be understood that certain of the variants described earlier are equally applicable to this embodiment of the invention. As shown in FIG. 7, reservoir 102 is elevated above feed dish 109, so the flow of water in third conduit 112 is induced by gravitational forces. Other means may be used, for example, a pump or pressurized reservoir. A partitioned feed dish may be used.

Referring to FIG. 8, an animal feeder having three conduits is extended to supply a plurality of feed sites.

Reservoir 122 is a temperature-regulated open vessel which is continuously supplied with water through domestic water line 124. A float valve 126 controls the inflow of water from line 124 and maintains the level in reservoir 122 constant.

First and second circulation conduits 128 and 130, pump 132, and solenoid valve 134 provide continuous or intermittent circulation of water through heat exchange chambers 138 of feed dishes 140 at each feed site for cooling purposes only. For first circulation conduit 128 should it build up to a predetermined level, about 8 psi.

A third conduit 142 communicates with reservoir 122 and is connected with the bowls 144 of feed dishes 140 through float valves 146. Third conduit 142 thus provides a supply of water to each bowl 144 which is independent of the circulation system. The water in third conduit 142 flows in one direction only, from reservoir 122 to bowls 144, so there is no possibility that water from a bowl 144 can become intermingled with the circulating water, thus minimizing the risk of communication of disease from one animal to another.

As before, the connections of conduits 128, 130, 142 to feed dishes 140 are preferably made using quick connect/disconnect fittings for convenience and versatility.

Reservoir 122 is elevated above the feed sites so that gravitational forces induce the flow of water through third conduit 142 into bowls 144.

Variants of the animal feeder with three conduits and multiple feed sites are possible. The reservoir may be pressurized, as shown in FIG. 5, so that flow in third conduit 142 is induced by the fluid pressure differential. Alternatively, an appropriately low pressure, low volume pump (not illustrated) may be used in third conduit 142 to induce such flow.

FIGS. 10-13 show various types of feed dishes for use with the appropriate one, two or three conduit animal feeder as appropriate. Conventional quick connect/disconnect fittings are provided with.

FIG. 10 shows various types of feed dishes for use with the appropriate one, two or three conduit animal feeder as appropriate. Conventional quick connect/disconnect fittings are provided with stop valves to prevent flow or leakage when disconnected. Thus, if such fittings are used, virtually any of the feed dishes may be put into use in any animal feeder since any conduits or fittings which cannot be connected will be stopped. As shown in FIG. 10(b) and 10(d), the bowl optionally may be partitioned for use with more than one type of food.

As discussed earlier, the walls 208 which separate the bowl portion 210 of the feed dish from the heat exchange chamber 204 are preferably of metal to maximize conduction of heat between the bowl portion 210 and heat exchange chamber 204, whereas the outer walls 212 of the feed dish, the wall 214 of the feed bowl in FIG. 10(a), and the conduits generally are preferably insulated.

As these and other variations and combinations of the features described above can be utilized without departing from the spirit of the present invention, the foregoing description of the preferred embodiments should be taken by way of illustration rather than by way of limitation of the present invention as defined in the claims.

What is claimed is:

1. An animal feeding apparatus for delivering temperature-regulated liquid feed comprising:
   a feed bowl;
   storage means for retaining the liquid feed at a selected temperature at an elevation above the feed bowl;
   a supply conduit communicating with the storage means and the feed bowl for conveying the liquid feed to the feed bowl; and
   a float valve intermediate the supply conduit and the feed bowl to permit controlled inflow of the liquid feed and maintain the liquid feed at a predetermined level.

2. The animal feeding apparatus of claim 1 further comprising means for priming the liquid feed into the supply conduit.

3. The animal feeding apparatus of claim 1 further comprising flow control means in the supply conduit.

4. The animal feeding apparatus of claim 1 wherein the storage means comprises a reservoir adapted for placement in a refrigerator.

5. The animal feeding apparatus of claim 1 wherein the feed bowl is insulated.

6. An animal feeding apparatus for delivering temperature-regulated liquid feed comprising:
   storage means for retaining the liquid feed at a selected temperature;
   a supply conduit communicating with the storage means for conveying the liquid feed to a feed site, and a return conduit communicating with the storage means for conveying the liquid feed from the feed site to the storage means;
   means for inducing circulation of the liquid feed in the supply conduit and the return conduit;
   at least one feed dish having a bowl and a heat exchange chamber adjacent thereto, the heat exchange chamber being connectable to the supply conduit and the return conduit so as to induce circulation of the liquid feed in the heat exchange chamber;
   valve means associated with the feed dish intermediate the supply conduit and the bowl to permit controlled inflow of the liquid feed into the bowl; and
   means for inducing the inflow of liquid feed into the bowl.

7. The animal feeding apparatus of claim 6 wherein the valve means comprises a float valve to maintain the liquid feed at a predetermined level in the bowl.

8. The animal feeding apparatus of claim 6 wherein the heat exchange chamber is a cavity within the wall of the feed dish.

9. The animal feeding apparatus of claim 6 wherein the means for inducing circulation of the liquid feed comprises a pump.

10. The animal feeding apparatus of claim 9 further comprising control means for activating the pump at selected intervals, the pump being adapted to permit flow of the liquid feed when not activated.

11. The animal feeding apparatus of claim 10 further comprising a solenoid valve operable to alternatively permit and prevent flow of the liquid feed at successive selected intervals, the ends of the supply conduit and the return conduit being connected through the solenoid valve.

12. The animal feeding apparatus of claim 11 wherein the solenoid valve is activated by the control means, the control means being operable in a sequence of selected intervals first to open the solenoid valve and activate the pump, second to close the solenoid valve while activating the pump, and third to deactivate the pump.

13. The animal feeding apparatus of claim 6 wherein the storage means is elevated above the feed dish, the means for inducing inflow of liquid feed into the bowl thereby comprising gravitational forces.

14. The animal feeding apparatus of claim 6 wherein the feed dish is insulated.

15. The animal feeding apparatus of claim 6 wherein the bowl is partitioned into a solid food part and a liquid food part.

16. The animal feeding apparatus of claim 6 wherein the storage means comprises a refrigerated reservoir.

17. The animal feeding apparatus of claim 6 wherein the storage means comprises a pressurized reservoir, the means for inducing inflow of liquid feed into the bowl thereby comprising a pressure differential.

18. The animal feeding apparatus of claim 6 wherein the storage means comprises a heating element.

19. The animal feeding apparatus of claim 6 further comprising a secondary supply conduit for connecting the heat exchange chamber with the supply conduit, the secondary supply conduit including a first branch communicating with the feed bowl and a second branch communicating with the heat exchange chamber, and check valve means in said second branch to prevent return flow of the liquid feed.

20. An animal feeding apparatus for delivering temperature-regulated liquid feed comprising:
   storage means for retaining the liquid feed at a selected temperature;
   a first circulation conduit communicating with the storage means for conveying the liquid feed to a feed site, and a second circulation conduit communicating with the storage means for conveying the liquid feed from the feed site to the storage means;
   means for inducing circulation of the liquid feed in the first and second circulation conduits;
   a third conduit communicating with the storage means;
   at least one feed dish having a bowl and a heat exchange chamber adjacent thereto, the heat exchange chamber being connectable to the first and second circulation conduits so as to induce circulation of the liquid feed in the heat exchange chamber, the bowl being connectable to the third conduit;
   valve means associated with the feed dish intermediate the third conduit and the bowl to permit controlled inflow of the liquid feed into the bowl; and
   means for inducing the inflow of liquid feed into the bowl.

21. The animal feeding apparatus of claim 20 wherein the valve means comprises a float valve adapted to maintain the liquid feed at a predetermined level in the bowl.

22. The animal feeding apparatus of claim 20 wherein the means for inducing circulation of the liquid feed comprises a pump.

23. The animal feeding apparatus of claim 22 further comprising control means for activating the pump at selected intervals.

24. The animal feeding apparatus of claim 23 further comprising a solenoid valve operable to alternatively permit and prevent flow of the liquid feed at successive selected intervals, the ends of the first and second circulation conduits being connected through the solenoid valve.

25. The animal feeding apparatus of claim 24 wherein the solenoid valve is activated by the control means, the control means being operable in a sequence of selected intervals first to open the solenoid valve and activate the pump, second to close the solenoid valve while activating the pump, and third to deactivate the pump.

26. The animal feeding apparatus of claim 20 wherein the storage means is elevated above the feed dish, the means for inducing inflow of liquid feed into the bowl thereby comprising gravitational forces.

27. The animal feeding apparatus of claim 20 wherein the heat exchange chamber is a cavity within the wall of the feed dish.

28. The animal feeding apparatus of claim 20 wherein the feed dish is insulated.

29. The animal feeding apparatus of claim 20 wherein the bowl is partitioned into a solid food part and a liquid food part.

30. The animal feeding apparatus of claim 20 wherein the storage means comprises a refrigerated reservoir.

31. The animal feeding apparatus of claim 20 wherein the storage means comprises a pressurized reservoir, the means for inducing inflow of liquid feed into the bowl thereby comprising a pressure differential.

32. The animal feeding apparatus of claim 20 wherein the storage means comprises a heating element.

* * * * *